US009492843B2

(12) United States Patent
Hintze-Brüning et al.

(10) Patent No.: US 9,492,843 B2
(45) Date of Patent: Nov. 15, 2016

(54) METHOD FOR THE PRODUCTION OF HIGH-IMPACT LAYERS

(75) Inventors: Horst Hintze-Brüning, Münster (DE); Hans-Peter Steiner, Sendenhorst (DE); Fabrice Leroux, Le Cendre (FR); Anne-Lise Troutier, Clermont-Ferrand (FR)

(73) Assignees: BASF Coatings GmbH, Münster (DE); UNIVERSITÉ BLAISE PASCAL, Clermont-Ferrand (FR)

( * ) Notice: Subject to any disclaimer, the term of this patent is extended or adjusted under 35 U.S.C. 154(b) by 0 days.

(21) Appl. No.: 12/742,798

(22) PCT Filed: Nov. 6, 2008

(86) PCT No.: PCT/EP2008/009324
§ 371 (c)(1),
(2), (4) Date: Aug. 11, 2010

(87) PCT Pub. No.: WO2009/062620
PCT Pub. Date: May 22, 2009

(65) Prior Publication Data
US 2010/0323103 A1    Dec. 23, 2010

(30) Foreign Application Priority Data
Nov. 14, 2007 (DE) .................. 10 2007 054 247

(51) Int. Cl.
*B05D 5/00* (2006.01)
*B05D 7/14* (2006.01)
*B05D 7/00* (2006.01)
*C09D 167/00* (2006.01)
*C09D 175/04* (2006.01)

(52) U.S. Cl.
CPC . *B05D 5/00* (2013.01); *B05D 7/14* (2013.01); *B05D 7/577* (2013.01); *C09D 167/00* (2013.01); *C09D 175/04* (2013.01); *B05D 2202/10* (2013.01); *B05D 2601/20* (2013.01)

(58) Field of Classification Search
CPC ... C01F 7/005; B05D 3/067; B05D 2701/00; C23C 22/34; C23C 2222/20
USPC ......... 427/407.1, 409, 126, 58; 428/31, 323; 3/407.1, 409, 126, 58
See application file for complete search history.

(56) References Cited

U.S. PATENT DOCUMENTS

| | | | |
|---|---|---|---|
| 5,399,329 A * | 3/1995 | Schutz et al. ............ 423/415.1 |
| 6,514,473 B2 | 2/2003 | Noweck et al. | |
| 2002/0028288 A1 | 3/2002 | Rohrbaugh et al. | |
| 2003/0032719 A1* | 2/2003 | Sapper ................... 524/589 |
| 2003/0078445 A1* | 4/2003 | Fujii ..................... C01F 7/005 556/183 |
| 2004/0077778 A1* | 4/2004 | Hazan et al. ............... 524/589 |
| 2004/0101629 A1* | 5/2004 | Baumgart et al. ......... 427/407.1 |
| 2004/0175572 A1* | 9/2004 | Hintze-Bruning et al. ........... 428/422.8 |
| 2004/0229987 A1* | 11/2004 | Kobayashi et al. ........... 524/424 |
| 2005/0022693 A1* | 2/2005 | Sinko et al. ............... 106/14.44 |
| 2005/0080177 A1* | 4/2005 | Fujii et al. ................ 524/437 |
| 2005/0085569 A1 | 4/2005 | Yuan et al. | |
| 2005/0235873 A1* | 10/2005 | Gichuhi et al. ............ 106/481 |
| 2006/0046068 A1 | 3/2006 | Barancyk et al. | |
| 2007/0117916 A1* | 5/2007 | Anderson et al. ............ 524/556 |

FOREIGN PATENT DOCUMENTS

| | | |
|---|---|---|
| DE | 4005961 A1 | 8/1991 |
| EP | 1192200 B1 | 4/2002 |
| EP | 0788523 B2 | 11/2002 |
| JP | 2002180000 A | 6/2002 |
| JP | 2003327916 A | 11/2003 |
| JP | 2004-091647 A | 3/2004 |
| JP | 2005270861 A | 10/2005 |
| WO | WO01/04050 A1 | 1/2001 |
| WO | WO03/016413 A1 | 2/2003 |

OTHER PUBLICATIONS

Wisconsin Polytechnical Institute General Chemistry Course Chapter 10 Phase Equilibrium CH1010 http://www.wpi.edu/Academics/Depts/Chemistry/Courses/General/concep10.html.*
PPG Automotive Coatings, Waterborne Primers, http://www.ppg.com/coatings/autooem/products/Pages/primersurfacer.aspx, retrieved May 5, 2012.*
International Search Report for International application No. PCT/EP2008/009324 dated Feb. 3, 2009.
Written Opinion for International application No. PCT/EP2008/009324.
Database WPI Week 200279; Thomson Scientific, london, GB; AN 2002-725984; XP002511648.
Database WPI Week 200576; ThomasonScientific, London, GB; AN 2005-737570; XP02511649.
International Preliminary Report on Patentability for International Application No. PCT/EP2008/009324 issued Jun. 29, 2010, 6 pages.

* cited by examiner

*Primary Examiner* — Francisco Tschen
(74) *Attorney, Agent, or Firm* — Servilla Whitney LLC

(57) ABSTRACT

The invention relates to a method of increasing the stonechip resistance of OEM coat systems composed of an anticorrosion coat, a surfacer coat, and a concluding topcoat, in which 0.1% to 30% by weight, based on the nonvolatile fractions of the coating material, of electrically charged inorganic particles AT whose ratio D/d, the ratio of the average particle diameter (D) to the average particle thickness (d), is >50 and whose charge is at least partly compensated by singly charged organic counterions OG, are incorporated into the coating material that is used to produce at least one of said coats and that comprises at least one polymer P, and the coating material is applied and, lastly, is cured.

14 Claims, No Drawings

METHOD FOR THE PRODUCTION OF HIGH-IMPACT LAYERS

CROSS REFERENCE TO RELATED APPLICATIONS

This application is a National Phase Application of Patent Application PCT/EP2008/009324 filed on 6 Nov. 2008, which claims priority to DE 102007054247.1, filed 14 Nov. 2007, both of which are hereby incorporated by reference in their entirety.

FIELD OF THE INVENTION

The invention relates to automotive coatings and more particularly to high-impact OEM composite layers.

BACKGROUND OF THE INVENTION

The provision of stonechip-resistant coatings on metallic substrates is of especial importance in the field of automotive manufacture. A surfacer or antistonechip primer is subject to a series of requirements. Hence the surfacer coat after curing is to bring about high stonechip resistance, more particularly in respect of multiple impact, and at the same time effective adhesion to the primer, more particularly to the cathodic electrodeposition coat (electrocoat for short) and to the basecoat, good filling properties (hiding the structure of the substrate) at coat thicknesses of about 20 to 35 μm, and good appearance in the context of the concluding clearcoat. Moreover, suitable coating materials, not least on environmental grounds, are to be preferably low in, or very substantially free from, organic solvents.

Coating materials for surfacers are known and are described in, for example, EP-A-0 788 523 and EP-A-1 192 200. Described therein are water-dilutable polyurethanes as binders for surfacers which are intended to ensure stonechip resistance, particularly at comparatively low coat thicknesses. On exposure in stonechip tests, however, in spite of good stonechip resistance, in other words a comparatively small number of instances of damage, the prior-art surfacers in OEM coat systems (electrocoat/surfacer/basecoat/clearcoat), nevertheless frequently exhibit damage patterns on the paint film where the unprotected metal substrate is exposed as a result of uncontrolled crack propagation in the OEM coat system and subsequent delamination at the interface between metal and electrocoat.

WO-A-01/04050 discloses inorganic anionic or cationic layered fillers for aqueous coating materials having good barrier properties, modified with organic compounds to widen the distance between the layers in the filler, said organic compounds having at least two ionic groups separated by at least four atoms. Cationic fillers employed may be mixed hydroxides, such as, more particularly, hydrotalcite types. The coating materials described in WO-A-01/04050 are used for coatings having very good barrier properties with respect to gases and liquids, the fillers being said not to affect the curing operation. The use of the coating materials to improve the damage patterns after impact exposure in OEM coat systems, more particularly for reducing the surface area of exposed substrate, is unknown. The coating compositions described in WO-A-01/04050 are of very limited suitability for use in OEM coat systems, since the multiple charge of the organic modifiers in the applied film produces a high local density of charges, which leads macroscopically to an increased hygroscopicity on the part of the cured coat, which has negative consequences in particular for the condensation resistance of the coat.

EP-A-0 282 619 describes solventborne anticorrosion coating materials comprising powderous mixed hydroxides, where anions used can be salicylate anions. The use of the coating materials to improve the damage patterns following impact exposure in OEM coat systems, more particularly for reducing the surface area of exposed substrate, is unknown.

M. L. Nobel et al. (Progress in Organic Coatings 58 (2007), 96-104) describe coating materials which can be used inter alia for OEM systems, comprising binders, crosslinkers, and aromatic fillers which have been modified with cationic organic compounds in order to widen the spacing of the layers in the filler. Cationic organic compounds of this kind are far less stable in aqueous phase than corresponding anionic compounds, and have a tendency, particularly in the case of the ammonium compounds to discolor when the coating material is cured, which can lead to unwanted shifts of shade in the coating. One feature emphasized is the accumulation of the modified inorganic fillers at the phase boundaries between droplets of dispersed polymer and water, or in the droplets, which is said to lead to an improved rheology and also to increased stiffness of the coats produced with the coating material. Generally speaking, an increase in stiffness in relatively thin coats leads to an increased tendency toward brittle fracture and hence to an increased exposure of substrate surface, and hence to an impaired damage pattern. The use of the coating materials described by M. L. Nobel et al. to improve the damage patterns following impact exposure in OEM coat systems, more particularly for reducing the surface area of exposed substrate, is not described.

In the light of the prior art, a problem which is left to be addressed by the present invention is the provision of stonechip-resistant coatings, based more particularly on environmentally advantageous aqueous coating materials, having a distinctly improved damage pattern, more particularly featuring a distinct reduction in the delamination of the integrated OEM coat system at the interface between metal and electrocoat, and hence featuring a distinct reduction in exposed substrate surface area after impact exposure. In preferred embodiments of the invention the stonechip-resistant coatings ought to exhibit a low tendency to absorb water and a low tendency toward discoloration when the coat is cured.

SUMMARY OF THE INVENTION

Found, surprisingly, has been a method of increasing the stonechip resistance of OEM coat systems composed of an anticorrosion coat, a surfacer coat, and a concluding topcoat, in which 0.1% to 30% by weight, based on the nonvolatile fractions of the coating material, of electrically charged inorganic particles AT whose ratio D/d, the ratio of the average particle diameter (D) to the average particle thickness (d), is >50 and whose charge is at least partly compensated by singly charged organic counterions (OG), are incorporated into the coating material that is used to produce at least one of the stated coats and that comprises at least one polymer (P), and the coating material is applied and, lastly, is cured.

DETAILED DESCRIPTION OF AN EMBODIMENT OF THE INVENTION

As components essential to the invention, the coating material used for the method of the invention comprises at least one film-forming polymer (P), 0.1% to 30% by weight, based on the nonvolatile fractions of the coating composition, of electrically charged inorganic particles (AT) whose ratio D/d, the ratio of the average particle diameter (D)—in the case of noncircular platelets, the particle diameter corresponds to the longest face diagonal of the particle—to the average particle thickness (d), is >50 and their charge being compensated at least partly by singly charged organic counterions (OG), being incorporated during the preparation of the coating material.

Under the conditions of curing on the substrate to be coated, the film-forming polymer (P) forms a coherent film. Preferably the film-forming polymer (P) comprises at least one water-dispersible polymer (WP), preferably selected from the group consisting of water-dispersible polyurethanes, polyesters, polyamides, polyepoxides, polyethers, and polyacrylates, with polyurethanes and polyesters being especially preferred.

Water-soluble or water-dispersible in the sense of the invention means that the polymers (WP) in the aqueous phase form aggregates having an average particle diameter of <500, preferably <200, and more preferably <100 nm, or are in molecularly dispersed solution. The size of the aggregates composed of polymer (WP) can be accomplished in a known way by introducing hydrophilic groups on the polymer (WP). The water-dispersible polymers (WP) preferably have mass-average molecular weights Mw (determinable by gel permeation chromatography using polystyrene as standard) of 1000 to 100 000 daltons, more preferably of 1500 to 50 000 daltons.

The polymers (P) preferably carry crosslinkable functional groups (a), in which context, in principle, suitability is possessed by all groups which are able to react with themselves and/or with further functional groups of the polymer (P) and/or with further constituents of the coating material used for the method of the invention, with formation of covalent bonds.

The crosslinking of the functional groups (a) may be induced by radiation and/or thermally.

Radiation-crosslinkable groups (a) are generally groups which, through exposure to actinic radiation, become reactive and are able to enter, together with other activated groups of their kind, into reactions involving formation of covalent bonds, these reactions proceeding in accordance with a free-radical and/or ionic mechanism. Examples of suitable groups (a) are single C—H bonds, single or double C—C, C—O, C—N, C—P or C—Si bonds, with preference being given to double C—C bonds.

In the preferred embodiment of the invention the crosslinking of the functional groups (a) is induced thermally, the groups (a) reacting with themselves and, i.e., with other groups (a), and/or preferably, with complementary groups. The selection of the functional groups (a) and also of the complementary groups is guided on the one hand by the consideration that they should not enter into any unwanted reactions, more particularly no premature crosslinking, during the preparation of the polymers (P) and also during the preparation, storage, and application of the coating materials, and secondly by the temperature range within which the crosslinking is to take place.

By way of example of groups (a) which react with themselves, mention may be made of the following: methylol, methylol ether, N-alkoxy-methylamino and, more particularly, alkoxysilyl groups.

By way of example of the inventively preferred pairings of groups (a) and complementary groups, mention may be made of the following: hydroxyl groups (a) with acid, acid anhydride, carbamate, unetherified or etherified methylol groups as functional group (b) and/or nonblocked or blocked isocyanate groups; amino groups (a) with acid, acid anhydride, epoxy and/or isocyanate groups as functional group (b); epoxy groups (a) with acid and/or amino groups as functional group (b); and mercapto groups (a) with acid, acid anhydride, carbamate and/or isocyanate groups as functional group (b). In one particularly preferred embodiment of the invention the complementary functional groups (b) are the constituent of a crosslinking agent (V), which is described later on.

More particularly, hydroxyl, amino and/or epoxy groups are preferred groups (a). Particular preference is given to hydroxyl groups, in which case the OH numbers of the polymer P according to DIN EN ISO 4629 are preferably between 10 and 200, more preferably between 20 and 150.

The functional groups (a) are introduced into the polymer (P) via the incorporation of suitable molecular building blocks, in a way which is known to the skilled worker.

The particularly preferred water-dispersible polyurethanes (WP) can be prepared from building blocks of the kind described, for example, in DE-A-40 05 961 or EP-A-1 192 200. Incorporated in the polyurethane molecules are, preferably, groups capable of forming anions, these groups, following their neutralization, ensuring that the polyurethane resin can be stably dispersed in water. Suitable groups capable of forming anions are preferably carboxylic acid groups, sulfonic acid groups, and phosphonic acid groups, more preferably carboxylic acid groups. The acid number of the polyurethane resins according to DIN EN ISO 3682 is preferably between 10 and 80 mg KOH/g, more preferably between 20 and 60 mg KOH/g. The groups capable of forming anions are preferably neutralized using ammonia, amines and/or amino alcohols, such as diethylamine and triethylamine, dimethylaminoethanolamine, diisopropanolamine, morpholines and/or N-alkylmorpholines, for example. As functional group (a) it is preferred to use hydroxyl groups, in which case the OH numbers of the polyurethane resins according to DIN EN ISO 4629 are preferably between 10 and 200, more preferably between 20 and 150.

The likewise particularly preferred water-dispersible polyesters (WP) can be prepared from building blocks of the kind described, for example, in DE-A-40 05 961. Incorporated in the polyester molecules are, preferably, groups capable of forming anions, these groups, following their neutralization, ensuring that the polyester resin can be stably dispersed in water. Suitable groups capable of forming anions are preferably carboxylic acid groups, sulfonic acid groups, and phosphonic acid groups, more preferably carboxylic acid groups. The acid number of the polyester resins according to DIN EN ISO 3682 is preferably between 10 and 80 mg KOH/g, more preferably between 20 and 60 mg KOH/g. The groups capable of forming anions are preferably likewise neutralized using ammonia, amines and/or amino alcohols, such as diethylamine and triethylamine, dimethylaminoethanolamine, diisopropanolamine, morpholines and/or N-alkylmorpholines, for example. As functional group (a) it is preferred to use hydroxyl groups, in which case the OH numbers of the polyester resins according to DIN EN ISO 4629 are preferably between 10 and 200, more preferably between 20 and 150.

In the coating composition used for the method of the invention the binder is present preferably in fractions of 10% to 95% by weight, more preferably of 20% to 80% by weight, based on the nonvolatile fractions of the coating material.

The crosslinking agent (V) used in the preferred embodiment of the invention has at least two functional groups (b) which, as complementary groups, react with the functional groups (a) of the polymer (P) when the coating material is cured, with formation of covalent bonds. The functional groups (b) may be brought to reaction by radiation and/or thermally. Preference is given to thermally crosslinkable groups (b). In the sense of the above definition, the crosslinking agents V are preferably water-dispersible.

In the coating material used for the method of the invention, the crosslinking agent (V) is present preferably in fractions of 5% to 50% by weight, more preferably of 10% to 40% by weight, based on the nonvolatile fractions of the coating material.

Preference is given to functional complementary groups (b) in the crosslinking agent (V) which react with the preferred functional groups (a), selected from the group consisting of hydroxyl, amino and/or epoxy groups. Particularly preferred complementary groups (b) are selected from the group of the carboxyl groups, the nonblocked or blocked polyisocyanate groups, the carbamate groups and/or the methylol groups, which if desired have been wholly or partly etherified with alcohols.

Very particular preference is given to functional complementary groups (b) in the crosslinking agent (V) which react with the particularly preferred hydroxyl groups as functional groups (a), with (b) preferably being selected from the group of the nonblocked or blocked polyisocyanate groups and/or of the methylol groups, which if desired have been wholly or partly etherified with alcohols.

Examples of suitable polyisocyanates and suitable blocking agents are described in, for example, EP-A-1 192 200, the blocking agents more particularly having the function of preventing unwanted reaction of the isocyanate groups with the reactive groups (a) of the polymer (P) used for the method of the invention and also with further reactive groups in the further components of the coating material used for the method of the invention, both before and during application. The blocking agents are selected such that the blocked ioscyanate groups undergo deblocking again only in the temperature range in which the thermal crosslinking of the coating material is to take place, more particularly in the temperature range between 120 and 180 degrees C., and then enter into crosslinking reactions with the functional groups (a).

As components containing methylol groups it is possible more particularly to use water-dispersible amino resins, of the kind described in, for example, EP-A-1 192 200. Preference is given to using amino resins, more particularly melamine-formaldehyde resins, which react in the temperature range between 100 and 180 degrees C., preferably between 120 and 160 degrees C., with the functional groups (a), more particularly with hydroxyl groups.

Besides the aforementioned binders and the preferred crosslinking agent (V), the coating material used for the method of the invention may further comprise additional unfunctionalized or functionalized, preferably water-dispersible binder constituents in fractions of up to 40% by weight, preferably up to 30% by weight, based on the nonvolatile constituents of the coating material.

The coating material used for the method of the invention may further comprise typical coatings additives in effective amounts. Thus, for example, color and effect pigments and also typical fillers in known amounts may be part of the coating material. The pigments and/or fillers may be composed of organic or inorganic compounds and are listed by way of example in EP-A-1 192 200. Further additives which can be employed are, for example, UV absorbers, free-radical scavengers, slip additives, polymerization inhibitors, defoamers, emulsifiers, wetting agents, flow control agents, film-forming assistants, rheology control additives, and, preferably, catalysts for the reaction of the functional groups (a), (b) and/or below-described groups (c), and additional crosslinking agents for the functional groups (a), (b) and/or (c). Further examples of suitable coatings additives are described in, for example, the textbook "Lackadditive" [Additives for coatings] by Johan Bieleman, Verlag Wiley-VCH, Weinheim, N.Y., 1998.

In the coating material used for the method of the invention, the aforementioned additives are present preferably in fractions of up to 40% by weight, preferably up to 30% by weight, and more preferably up to 20% by weight, based on the nonvolatile constituents of the coating material.

Incorporated in the coating material used for the method of the invention are 0.1% to 30% by weight, preferably between 0.5% and 25% by weight, more preferably between 1% and 20% by weight, based on the nonvolatile fractions of the coating material, of solid or, preferably, suspended electrically charged inorganic particles (AT) whose ratio D/d, the ratio of the average particle diameter (D) to the average particle thickness (d), is >50, preferably >100, more preferably >150, and whose charge is at least partly compensated by singly charged organic counterions (OG). The average particle diameters (D) can be determined via evaluation of TEM (Transmission Electron Microscope) graphs, while the particle thicknesses (d) are determined experimentally by way of x-ray structural analysis, profile measurements by means of AFM (Atomic Force Microscopy) on individual platelets, and also arithmetically, with knowledge of the molecular structure. The average particle diameter (D) of the electrically charged inorganic particles (AT) is preferably between 50 and 1000 nm, more preferably between 100 and 500 nm; the average particle thickness (d) is preferably between 0.1 and 1.0 nm, especially preferably between 0.2 and 0.75 nm. Typically the particle thicknesses (d) are determined by way of the interlayer spacings, determined in turn by x-ray diffraction, between the electrically charged inorganic particles. The interlayer spacing encompasses the sum of the particle thickness (d) of a particle and the spacing between two such particles. The latter spacing is dependent on the nature of the counterions present in the particle, which neutralize the electrical charge carriers of the particles, and also on the presence of electrically neutral molecules having a swelling action, such as water or organic solvents. Thus it is known, for example, that the interlayer spacing in montmorillonite varies between 0.97 and 1.5 nm as a function of the water content of the naturally occurring ambient conditions (J. Phys. Chem. B, 108 (2004), 1255).

The electrically charged inorganic particles (AT) can be produced by swapping the naturally present or as-synthesized counterions of the layerlike minerals for the singly charged organic counterions (OG), in accordance with methods that are known per se, or by synthesis in the presence of the singly charged organic counterions (OG). For this purpose, for example, the electrically charged inorganic particles (AT) are suspended in a suitable liquid medium, which is capable of swelling the interstices between the individual layers, and in which the organic counterions (OG) are in solution, and subsequently isolating them again (Langmuir 21 (2005), 8675).

When ionic exchange takes place, preferably more than 15 mol %, more preferably more than 30 mol %, of the counterions from the synthesis are replaced by the singly charged organic counterions (OG). Depending on the size and the spatial orientation of the organic counterions, the layer structures are generally widened, with the distance between the electrically charged layers (interlayer spacing) being widened preferably by at least 0.2 nm, more preferably by at least 0.5 nm.

The singly charged organic counterions (OG) used for at least partial compensation of the charge and for distancing of the organic particles (AT) have the following construction: acting as charge carriers for the singly charged organic counterions of the inorganic particles (AT) are, preferably, cationic and/or anionic groups, such as, with particular preference, as cations, singly charged, alkyl-substituted sulfonium and/or phosphonium ions, which preferably do not give rise to any discoloration of the inventively produced coat when that coat is cured, and also, with particular preference, as anions, singly charged anions of carboxylic acid, of sulfonic acid and/or of phosphonic acid. The singly charged organic counterions (OG) preferably have molecular weights of <1000 daltons, more preferably <500 daltons.

Examples of substances suitable for preparing the inorganic particles (AT) include clay minerals, such as, more particularly, naturally occurring smectite types, such as montmorillonite, saponite, hectorite, fluorohectorite, beidellite, nontronite, vermiculite, halloysite and stephanite, or synthesized smectite types, such as Laponite or SOMASIF (synthetic fluorinated sheet silicate from CO—OP Chemical Co, Japan). The aforementioned minerals have a negative surface charge, which on exfoliation is at least partly compensated by the abovementioned positively charged, singly charged organic counterions (OG).

Particularly preferred for the purposes of the invention are charged inorganic particles (AT), such as, more particularly, the mixed hydroxides of the formula:

where $M^{2+}$ represents divalent cations, $M^{3+}$ represents trivalent cations, and (A) represents anions having a valence y, with x adopting a value of 0.05 to 0.5.

Particularly preferred divalent cations $M^{2+}$ are calcium, zinc and/or magnesium ions, and particularly preferred trivalent cations $M^{3+}$ are aluminum ions, and particularly preferred anions (A) are chloride ions, phosphate ions, sulfate ions and/or carbonate ions, since these ions go a long way to ensuring that there is no change in shade when the inventive coat is cured. The synthesis of the mixed hydroxides is known (for example, Eilji Kanezaki, Preparation of Layered Double Hydroxides in Interface Science and Technology, vol. 1, chapter 12, page 345 ff—Elsevier, 2004, ISBN 0-12-088439-9). The synthesis usually takes place from the mixtures of the salts of the cations in aqueous phase at defined, basic pH levels which are kept constant. The products are the mixed hydroxides containing the anions of the metal salts as inorganic counterions intercalating into the interstices. Where the synthesis takes place in the presence of carbon dioxide, the product is generally the mixed hydroxide with intercalating carbonate ions. If the synthesis is carried out in the absence of carbon dioxide or carbonate but in the presence of singly charged organic anions (OA) or their acidic precursors, the product is generally the mixed hydroxide with organic anions intercalating into the interstices (coprecipitation method or template method). An alternative synthesis route for the preparation of the mixed hydroxides is the hydrolysis of the metal alkoxides in the presence of the desired anions for intercalation (U.S. Pat. No. 6,514,473). It is possible, moreover, to introduce the singly charged organic anions for intercalation (OA) by means of ion exchange in mixed hydroxides with intercalated carbonate ions. This can be done, for example, especially when preparing hydrotalcites and hydrocalamites, by rehydrating the amorphous calcined mixed oxide in the presence of the desired anions for intercalation (OA). Calcining the mixed hydroxide containing intercalated carbonate ions at temperatures<800 degrees C. yields the amorphous mixed oxide, with retention of the layer structures (rehydration method).

Alternatively the ion exchange may take place in an aqueous or aqueous-alcoholic medium in the presence of the acidic precursors of the organic anions for intercalation. In this case, depending on the acid strength of the precursor of the singly charged organic anions for intercalation (OA), treatment with dilute mineral acids is needed in order to remove the carbonate ions.

The charge carriers of the singly charged organic anions (OA) used for at least partial compensation of the charge and for widening of the aforementioned mixed hydroxides are preferably anionic groups (AG), such as, with particular preference, singly charged ions of carboxylic acid, of sulfonic acid and/or of phosphonic acid.

In a further preferred embodiment of the invention the singly charged organic counterions (OG) additionally carry functional groups (c) which, when the coating material is cured, react with the functional groups (a) of the binder BM and/or with the functional groups (b) of the crosslinker, with formation of covalent bonds. The groups (c) may be radiation-curable and/or thermally curable. Preference is given to thermally curable groups (c), of the kind indicated above in the context of the description of groups (a) and (b). More preferably the functional groups (c) are selected from the group consisting of hydroxyl, epoxy and/or amino groups.

The functional groups (c) are preferably separated from the anionic groups (AG) of the singly charged organic anions (OA) by a spacer (SP), with (SP) being selected from the group consisting of unsubstituted and substituted aliphatics and/or cyclialiphatics which if desired are modified with heteroatoms, such as nitrogen, oxygen and/or sulfur, and which have a total of 3 to 30 carbon atoms, preferably between 4 and 20 carbon atoms, more preferably between 5 and 15 carbon atoms; unsubstituted and substituted aromatics which if desired are modified with heteroatoms, such as nitrogen, oxygen and/or sulfur, and which have a total of 3 to 20 carbon atoms, preferably between 4 and 18 carbon atoms, more preferably between 5 and 15 carbon atoms; and/or substructures of the above-recited cycloaliphatics and aromatics, the substructures more particularly containing at least 3 carbon atoms and/or heteroatoms between the functional group (c) and the anionic group (AG).

More preferably the spacers (SP) of the singly charged organic anions (OA) are unsubstituted or substituted phenyl or cyclohexyl radicals which have the functional group (c) positioned m or p to the anionic group (AG). In this case use is made in particular of hydroxyl and/or amino groups as functional group (c) and of carboxylate and/or sulfonate groups as anionic group (AG).

Very particularly preferred singly charged organic anions (OA) are m- or p-aminobenzenesulfonate, m- or p-hydroxybenzenesulfonate, m- or p-aminobenzoate and/or m- or p-hydroxybenzoate.

In the abovementioned, particularly preferred mixed hydroxides which from their synthesis preferably contain carbonate as anion (A) the ion exchange replaces preferably more than 15 mol %, more preferably more than 30 mol %, of the anions (A) by the singly charged organic anions (OA).

The modification of the cationically charged inorganic particles (AT) is preferably carried out in a separate process prior to incorporation into the coating material of the invention, this process being carried out with particular preference in an aqueous medium. The electrically charged inorganic particles (AT) modified with the singly charged organic anions (OA) are preferably prepared in one synthesis step. The particles thus prepared have only a very slight inherent color, and preferably are colorless.

The cationically charged particles modified with singly charged organic anions (OA) can be prepared in one synthesis step more particularly from the metal salts of the cations and from the organic ions. In this case, preferably, an aqueous mixture of salts of the divalent cations $M^{2+}$ and of the trivalent cations $M^{3+}$ is introduced into an aqueous alkaline solution of the singly charged organic anion (OA) until the desired stoichiometry has been established. The addition takes place preferably in a $CO_2$-free atmosphere, preferably under an inert gas atmosphere, under nitrogen, for example, with stirring at temperatures between 10 and 100 degrees C., more preferably at room temperature, with the pH of the aqueous reaction mixture being kept in the range from 8 to 12, preferably between 9 and 11, by the addition, preferably, of alkaline hydroxides, more preferably NaOH. Following addition of the aqueous mixture of the metal salts, the resulting suspension is aged at the aforementioned temperatures for a time of 0.1 to 10 days, preferably 3 to 24 hours, the resulting precipitate is isolated, preferably by centrifugation, and the isolated precipitate is washed repeatedly with deionized water. Thereafter, from the purified precipitate, a suspension is produced of the cationically charged particles (AT) modified with the singly charged organic anions (OA), having a solids content of 5% to 50% by weight, preferably of 10% to 40% by weight.

In the process of the invention for preparing the coating material, the suspensions of the modified electrically charged inorganic particles (AT) that are prepared in this way can be incorporated in principle during any phase; in other words before, during and/or after the addition of the other components of the coating material.

The crystallinity of the resulting layered double mixed hydroxides as modified electrically charged inorganic particles (AT) is dependent on the selected synthesis parameters, on the nature of the cations employed, on the ratio of the $M^{2+}/M^{3+}$ cations, and on the nature and the amount of the anions employed, and ought to adopt values which are as large as possible.

The crystallinity of the mixed hydroxide phase can be expressed as the calculated size of the coherent scattering domains from the analysis of the corresponding x-ray diffraction lines, examples being the [003] and [110] reflections in the case of the Mg Al hydrotalcite. Thus, for example, Eliseev et al. (Doklady Chemistry 387 (2002), 777) show the effect of thermal aging on the growth of the domain size of the Mg Al hydrotalcite investigated, and explain this by the progressive incorporation of extant tetrahedrally coordinated aluminum into the mixed hydroxide layer in the form of octahedrally coordinated aluminum, shown via the relative intensities of the corresponding signals in the $^{27}Al$-NMR spectrum.

The preferably aqueous coating materials of the invention are preferably prepared by first mixing all of the constituents of the coating material apart from the modified electrically charged inorganic particles (AT) and the crosslinking agent (V). The modified electrically charged inorganic particles (AT) or, preferably, the suspension of the modified electrically charged inorganic particles (AT) as prepared, preferably, by the process recited above are introduced into the resulting mixture with stirring, preferably until the suspension has undergone full dissolution, which can be monitored by optical methods, more particularly by visual inspection. The resulting mixture is treated preferably at temperatures between 10 and 50 degrees C. for a time of 2 to 30 minutes, preferably of 5 to 20 minutes, preferably at room temperature, with ultrasound, while stirring, in order to obtain more finely particulate, more homogeneous dispersion of the preparation of the inorganic particles AT; in one particularly preferred embodiment, the tip of an ultrasound source is immersed into the mixture. During the ultrasound treatment the temperature of the mixture may rise by 10 to 60 K. The dispersion thus obtained is preferably aged at room temperature for at least 12 hours with stirring. Thereafter the crosslinking agent (V) is added, with stirring, and the dispersion is adjusted, preferably with water, to a solids content of 15% to 50% by weight, preferably 20% to 40% by weight.

In the method of the invention, the coating materials are applied preferably in a wet film thickness such that, after curing, the resulting dry film thickness in the completed coats is between 1 and 100 µm, preferably between 5 and 75 µm, more preferably between 10 and 60 µm, more particularly between 15 and 50 µm.

The application of the coating material in the method of the invention can be accomplished by means of typical application methods, such as spraying, knife coating, spreading, pouring, dipping or rolling, for example. It is preferred to employ spray application methods, such as compressed-air spraying, airless spraying, high-speed rotational spraying, and electrostatic spray application (ESTA), for example. Application is carried out generally at temperatures of not more than 70 to 80 degrees C., thereby allowing suitable application viscosities to be attained without the brief thermal exposure being accompanied by change or damage to the coating material or to its overspray, which if appropriate can be reprocessed.

The radiation curing of the applied film in the method of the invention with the coating material with radiation-crosslinkable groups takes place with actinic radiation, more particularly with UV radiation, preferably in an inert atmosphere, as described in WO-A-03/016413, for example.

The preferred thermal curing of the applied film in the method of the invention with the coating material with thermally crosslinkable groups takes place by the known methods in the method of the invention, as, for example, by heating in a forced-air oven or by irradiation using infrared lamps. Advantageously the thermal cure takes place at temperatures between 100 and 180 degrees C., preferably between 120 and 160 degrees C., for a time of between 1 minute and 2 hours, preferably between 2 minutes and 1 hour, more preferably between 10 and 45 minutes. Where substrates are used, such as metals, for example, which have the capacity to withstand a high thermal load, the cure may also be carried out at temperatures above 180 degrees C. Generally speaking, however, it is advisable not to exceed temperatures of 160 to 180 degrees C. Where, on the other hand, substrates such as plastics, for example, are used which have a maximum limit to their ability to withstand thermal loads, the temperature and the time needed for the curing operation must be brought into line with this maximum limit.

In accordance with the invention the aforementioned coating material is used for increasing the stonechip resistance in OEM coat systems on metallic substrates and/or plastics substrates, these systems being composed, starting from the substrate, of an electrolytically deposited anticorrosion coat, preferably a cathodically deposited coat, a surfacer coat applied to the anticorrosion coat, and a topcoat applied to the surfacer coat, the topcoat being constructed preferably from a color-imparting basecoat material and a concluding clearcoat material. Here, the coating materials prepared in accordance with the invention are used to construct at least one of the coats in the OEM coat system. Preferably the coating materials prepared in accordance with the invention are used to construct the surfacer coat. When the coating material prepared in accordance with the invention is used as a surfacer, the electrocoat material, more particularly the cathodic electrocoat material, is preferably cured before the coating material of the invention is applied. In a further preferred method, the film formed from the coating material of the invention is coated in two further stages first with a basecoat material and, lastly, with a clearcoat material. In this case, in one preferred method, first the film of the coating material of the invention is cured and then, preferably in a first step, an aqueous basecoat material is applied and, after a flash for a time between 1 to 30 minutes, preferably between 2 and 20 minutes, at temperatures between 40 and 90 degrees C., preferably between 50 and 85 degrees C., and in a second step, the basecoat film is overcoated with a clearcoat material, preferably a two-component clearcoat material, and basecoat and clearcoat are cured jointly. In a further preferred embodiment of the invention the surfacer film produced with the coating material of the invention is flashed prior to application of the basecoat film, for a time between 1 to 30 minutes, preferably between 2 and 20 minutes, at temperatures between 40 and 90 degrees C., preferably between 50 and 85 degrees C. Thereafter, surfacer film, basecoat film, and clearcoat film are jointly cured.

The OEM coat systems produced in this way exhibit excellent resistance to impact stress, more particularly to stonechipping. In comparison to OEM coat systems with prior-art surfacers a reduction is observed in particular in the fraction of the surface that is damaged, and a very significant reduction in the fraction of the surface that is completely worn away, in other words the fractional area of the unprotected substrate. In addition to these outstanding properties, the coatings produced with the coating materials of the invention exhibit excellent condensation resistance, excellent adhesion to the anticorrosion coat and to the topcoat, more particularly to the basecoat, and excellent stability of the inherent color after curing, which also allows the coating materials prepared in accordance with the invention to be used as a topcoat component. Moreover, with the coating material of the invention, coatings can be realized which have a comparatively low baking temperature and a good topcoat appearance.

The examples which follow are intended to illustrate the invention.

EXAMPLES

Preparation Example 1

Synthesis and Modification of Hydrotalcite

A 0.21 molar aqueous solution of 4-aminobenzenesulfonic acid (4-absa) is admixed with an aqueous mixture of $MgCl_2.6H_2O$ (0.52 molar) and $AlCl_3.6H_2O$ (0.26 molar) at room temperature under a nitrogen atmosphere and with constant stiffing over 3 hours, the amount of cations added being selected so that it results in a molar ratio of 4-absa counterion to trivalent Al cation of 4:1. The pH during this time is kept constant at a level of 10 by addition of a 3 molar NaOH solution. Following addition of the aqueous mixture of the metal salts, the resulting suspension is aged at room temperature for 3 hours. The resulting precipitate is isolated by centrifugation and washed 4 times with deionized water. The Washed Precipitate is Suspended in Water.

The resulting suspension of the white reaction product $Mg_2Al(OH)_6$(4-absa).$2H_2O$ (hydrotalcite suspension) has a solids content of 26.3% by weight and a pH of 10.

Preparation Example 2

Formulation of the Coating Material of the Invention 16.1 g of the hydrotalcite suspension prepared as per example 1 are introduced with stirring into 88.9 g of an aqueous polyurethane dispersion having a solids content of 40% by weight (DAOTAN VTW 1225 from CYTEC Corp., with an OH number to DIN EN ISO 4629 of 45 and an acid number to DIN EN ISO 3682 of 40 mg KOH/g), until the hydrotalcite suspension has undergone full dissolution (visual inspection). The resulting dispersion is treated with ultrasound for 15 minutes at room temperature, while stirring, the tip of an ultrasound source (Sonotrode UP 100H from Hielscher GmbH) being immersed into the dispersion, and the amplitude and pulse rate being each set at 100% with an operating frequency of 30 kHz. In the course of the ultrasound treatment there is an increase in the temperature of the dispersion to 65 degrees C.

The resulting dispersion is aged for 12 hours and subsequently admixed with 9.6 g of melamine-formaldehyde resin (Maprenal MF 900 from Ineos Melamines GmbH) with stirring at room temperature. Addition of a further 50 g of deionized water gives an aqueous dispersion having a solids content of 28.0% by weight and a pH of 7.4.

Example 3

Application of the Coating Material of the Invention and Testing of the Stonechip Resistance The coating material of the invention prepared as per example 2 is applied by spraying (Automatic Coater from Köhne) to pretreated steel panels precoated with a cathodic electrocoat material (steel panels from Chemetall: thickness of the baked cathodic electrocoat: 21+/−2 μm, thickness of the substrate: 750 μm). The resulting film of the coating material of the invention is cured at 140 degrees C. for 20 minutes, giving a dry film thickness of 30+/−3 μm. Evaluation of TEM micrographs of cross sections of the baked coating material show that the ratio (D/d) of the average particle diameter (D) of the dispersed hydrotalcite particles to their average particle thickness (d) is approximately 200.

For comparison purposes, a commercial surfacers (FU43-9000 from BASF Coatings AG: reference surfacer) is applied to the pretreated steel panels precoated with a cathodic electrocoat, and cured in accordance with the manufacturer's instructions at 150 degrees C. for 20 minutes, this application and curing taking place in such a way as to produce, again, a dry film thickness of 30+/−3 μm.

Continuing, an OEM coat system is produced on the panels thus precoated by applying, in separate steps, first a commercial aqueous basecoat material (FV95-9108 from BASF Coatings AG), which is flashed at 80 degrees C. for 10 minutes, and, lastly, a 2-component solventborne clearcoat material (FF95-0118 from BASF Coatings AG). The aqueous basecoat film and the clearcoat film are cured jointly at 140 degrees C. for 20 minutes, after which the basecoat has a dry film thickness of approximately 15 μm and the clearcoat has a dry film thickness of 45 μm.

The panels thus coated are stored for 3 days at 23 degrees C. and 50% relative humidity.

Testing of the Stonechip Resistance:

The coated steel panels produced as described above are subjected to a DIN 55996-1 stonechip test, using 500 g each time of cooled iron granules (4 to 5 mm particle diameter, from Würth, Bad Friedrichshall) and setting an air pressure of 2 bar on the bombardment apparatus (model 508 VDA from Erichsen).

After the test panels damaged in this way have been cleaned, they are immersed into a solution of an acidic copper salt, and elemental copper is deposited on those areas of the steel substrate at which bombardment had removed the coating completely.

The damaged pattern over 10 cm² of each of the damaged and aftertreated test panels is captured using image processing software (SIS-Analyse, BASF Coatings AG, Munster). Evaluations are made of the fractions of surfaces damaged by bombardment, and of the fractions of surfaces completely worn away, based in each case on the total surface area. Table 1 sets out the results.

TABLE 1

Damage patterns of the coat systems produced with the coating material of the invention and with the reference surfacer

|  | Inventive coating (example 2) | Reference surfacer |
| --- | --- | --- |
| Fraction of surface completely worn away (% area) | <0.1 | 0.6 |
| Fraction of surface damaged by bombardment (% area) | 5 | 10 |

As compared with the coat systems produced using the reference surfacer, the coat systems produced using the coating material of the invention as surfacer material feature a reduction in the fraction of the surface damaged by 50%, and a very significant reduction in the fraction of surface completely worn away, in other words the area fraction of the unprotected metal substrate, of more than 80%.

The adhesion to the coat of the cathodic electrocoat and to the basecoat is excellent, and this is reflected in a significantly reduced delamination at the coat boundaries.

The coating produced with the coating material of the invention, moreover, features excellent condensation resistance and a virtually unchanged inherent color after baking.

What is claimed is:

1. A method of increasing the stonechip resistance and adhesion of an OEM coat system comprising an anticorrosion coat, a surfacer coat, and a concluding topcoat, the method comprising,
introducing into an aqueous coating material comprising at least one film-forming water-dispersible polyurethane polymer (WP), wherein the water-dispersible polyurethane polymer (WP) in the coating material comprises at least one crosslinkable functional group (a), from 0.1 to 30% by weight, based on the nonvolatile fractions of the aqueous coating material, of positively charged inorganic particles (AT) having a ratio D/d, the ratio of an average particle diameter (D) to an average particle thickness (d), is >50 and whose charge is at least partly compensated by singly charged organic counterions (OG), the positively charged inorganic particles (AT) being in an aqueous suspension prior to introduction into the aqueous coating material, wherein the inorganic particles (AT) comprise at least one mixed hydroxide of the general formula

where $M^{2+}$ represents divalent cations, $M^{3+}$ represents trivalent cations, (A) represents anions having a valence y, x is from 0.05 to 0.5, and where at least some of the anions (A) have been replaced by singly charged organic anions (QA) as organic counterions (OG), and applying the resulting aqueous coating material to a surface, the surface comprising an anticorrosion coat deposited on a substrate, and, lastly, curing it to provide the surfacer coat, wherein the stonechip resistance of the OEM coat system is increased as compared to an OEM coat system comprising the anticorrosion coat, a surfacer coat that does not comprise the inorganic particles (AT), and the concluding topcoat.

2. The method of claim 1, wherein at least 15 mol % of counterions resulting from synthesis in the positively charged inorganic particles (AT) have been replaced by the organic counterions (OG).

3. The method of claim 1, wherein the coating material comprises a crosslinking agent (V) having at least two crosslinkable functional groups (b), which when the coating material is cured react with the functional groups (a) of the water-dispersible polymer (WP) to form covalent bonds.

4. The method of claim 3, wherein the coating material comprises 10% to 95% by weight of a binder comprising the water-dispersible polyurethane polymer (WP), and 5% to 50% by weight of the crosslinking agent (V), based in each case on the nonvolatile constituents of the coating material.

5. The method of claim 3, wherein the singly charged organic counterions (OG) have at least one crosslinkable functional group (c) which when the coating material is cured react with the functional groups (a) and/or (b) to form a covalent bond.

6. The method of claim 1, wherein the coat produced with the coating material has a dry film thickness, after curing, of 5 to 75 μm.

7. The method of claim 1, further comprising wherein, in the production of the OEM coat system, the surfacer film is cured, in further steps a basecoat film and, after flashing off in between, a concluding clearcoat film is applied, and, lastly, the basecoat film and the clearcoat are jointly cured.

8. The method of claim 1, further comprising wherein, in the production of the OEM coat system, the surfacer film is applied and flashed off, in further steps a basecoat film and, after flashing off in between, a concluding clearcoat film is applied, and, lastly, the surfacer film, the basecoat film, and the clearcoat film are jointly cured.

9. The method of claim 1, wherein the water-dispersible polyurethane polymer (WP) in the coating material comprises at least one crosslinkable hydroxyl functional group (a) and the OH number of the water-dispersible polyurethane polymer (WP) is between 10 and 200.

10. The method of claim 1, wherein the water-dispersible polyurethane polymer (WP) in the coating material comprises at least one crosslinkable hydroxyl functional group (a) and the OH number of the water-dispersible polyurethane polymer (WP) is between 20 and 150.

11. The method of claim 1, wherein $M^{2+}$ represents calcium, zinc and/or magnesium divalent cations and $M^{3+}$ represents trivalent aluminum cations and (A) represents chloride ions, phosphate ions, sulfate ions and/or carbonate ions in the mixed hydroxide of the inorganic particles (AT).

12. The method of claim 1, wherein $M^{2+}$ represents magnesium divalent cations and $M^{3+}$ represent trivalent aluminum cations and (A) represents sulfate ions in the mixed hydroxide of the inorganic particles (AT).

13. The method of claim 1, wherein the at least one mixed hydroxide has the formula $Mg_2Al(OH)_6(4\text{-absa}).2H_2O$.

14. A method of increasing the stonechip resistance and adhesion of an OEM coat system comprising an anticorrosion coat, a surfacer coat, and a concluding topcoat, the method comprising, introducing into an aqueous coating material comprising at least one film-forming water-dispersible polyurethane polymer (WP), from 0.1 to 30% by weight, based on the nonvolatile fractions of the aqueous coating material, of positively charged inorganic particles (AT) having a ratio D/d, the ratio of an average particle diameter (D) to an average particle thickness (d), is >50 and whose charge is at least partly compensated by singly charged organic counterions (OG), the positively charged inorganic particles (AT) being in an aqueous suspension prior to introduction into the aqueous coating material, wherein the inorganic particles (AT) comprise at least one mixed hydroxide of the general formula

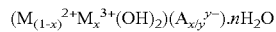

where $M^{2+}$ represents calcium, zinc and/or magnesium divalent cations, $M^{3+}$ represents trivalent aluminum cations, (A) represents chloride ions, phosphate ions, sulfate ions and/or carbonate ions anions having a valence y, x is from 0.05 to 0.5, and where at least 15 mol % of counterions resulting from synthesis in the positively charged inorganic particles (AT) have been replaced by singly charged organic anions (QA) as organic counterions (OG);

wherein the coating material further comprises a crosslinking agent (V) having at least two crosslinkable functional groups (b), which when the coating material is cured react with the functional groups (a) of the water-dispersible polyurethane polymer (WP) to form covalent bonds; and applying the resulting aqueous coating material to a surface, the surface comprising an anticorrosion coat deposited on a substrate, and, lastly, curing it to provide the surfacer coat, wherein the stonechip resistance of the OEM coat system is increased as compared to an OEM coat system comprising the anticorrosion coat, a surfacer coat that does not comprise the inorganic particles (AT) and the concluding topcoat.

* * * * *